US006478853B1

(12) United States Patent
Hara et al.

(10) Patent No.: US 6,478,853 B1
(45) Date of Patent: Nov. 12, 2002

(54) AMORPHOUS NI ALLOY MEMBRANE FOR SEPARATION/DISSOCIATION OF HYDROGEN, PREPARING METHOD AND ACTIVATING METHOD THEREOF

(75) Inventors: Shigeki Hara, c/o National Institute of Materials and Chemical Research, Agency of Industrial Science and Technology 1, Higashi 1-chome, Tsukuba-shi, Ibaraki-ken (JP); Keiji Sakaki, Tsukuba (JP); Naotsugu Itoh, Tsukuba (JP)

(73) Assignees: Secretary of Agency of Industrial Science and Technology, Tokyo (JP); Shigeki Hara, Ibaraki (JP)

( * ) Notice: Subject to any disclaimer, the term of this patent is extended or adjusted under 35 U.S.C. 154(b) by 0 days.

(21) Appl. No.: 09/515,242

(22) Filed: Mar. 6, 2000

(30) Foreign Application Priority Data

Mar. 9, 1999 (JP) ............................................. 11-062325
Apr. 30, 1999 (JP) ............................................. 11-123448

(51) Int. Cl.$^7$ .............................................. B01D 53/22
(52) U.S. Cl. ................................ 95/56; 96/4; 55/DIG. 5
(58) Field of Search ............................. 95/55, 56; 96/4, 96/10, 11; 55/DIG. 5

(56) References Cited

U.S. PATENT DOCUMENTS

| 3,241,293 A | * | 3/1966 | Pfefferle ............................. 95/56 |
| 3,344,582 A | * | 10/1967 | Merrill et al. .................... 95/56 |
| 3,957,534 A | * | 5/1976 | Linkohr et al. ................ 96/4 X |
| 4,634,454 A | * | 1/1987 | Khan et al. .................... 95/56 X |
| 4,781,734 A |   | 11/1988 | Behr et al. ...................... 55/16 |
| 4,810,485 A | * | 3/1989 | Marianowski et al. ....... 95/56 X |
| 4,944,777 A | * | 7/1990 | Shmayda et al. ............... 95/56 |
| 5,139,541 A | * | 8/1992 | Edlund ............................. 95/56 |
| 5,217,506 A | * | 6/1993 | Edlund et al. .................. 95/56 |
| 5,259,870 A | * | 11/1993 | Edlund ............................. 95/56 |
| 5,393,325 A | * | 2/1995 | Edlund ............................. 95/56 |

FOREIGN PATENT DOCUMENTS

| EP | 015428 A1 | 9/1980 | |
| JP | 59-205434 A | * 11/1984 | ........................ 96/4 |
| JP | 62-143801 A | * 6/1987 | ...................... 95/56 |
| JP | 63-004829 A | * 1/1988 | ..................... 96/11 |
| JP | 0126292 4 A | 10/1989 | |
| JP | 02-268818 | 11/1990 | |
| JP | 07000775 | 1/1995 | |
| SU | 0698914 | * 11/1979 | ..................... 95/56 |

OTHER PUBLICATIONS

Database WPI, Derwent Publications Ltd., London, GB; AN 1995–077295, XP002164166 corresponds with JP 07 000775 (Jan. 6, 1995).
Journal of the Less–Common Metals, 172–174 (1991) 922–927.
Ind. Eng. Chem. Res. 1996, 530–537.
Materials Transactions, JIM, vol. 32, No. 5 (1991), pp. 501–507.
Journal of Membane Science 139 (1998) 29–35.

* cited by examiner

*Primary Examiner*—Robert H. Spitzer
(74) *Attorney, Agent, or Firm*—Birch, Stewart, Kolasch & Birch, LLP

(57) ABSTRACT

There is disclosed a membrane for separation and dissociation of hydrogen, which comprises an amorphous alloy comprising at least one selected from the group consisting of Zr and Hf, and Ni. The membrane has high permeability only with regard to hydrogen, sufficient mechanical strength and structural stability in an atmosphere of hydrogen, and it does not require, substantially, noble metals, such as Pd and the like.

32 Claims, 2 Drawing Sheets

AMORPHOUS NI ALLOY MEMBRANE FOR SEPARATION/DISSOCIATION OF HYDROGEN, PREPARING METHOD AND ACTIVATING METHOD THEREOF

FIELD OF THE INVENTION

The present invention relates to a membrane capable of separation and purification of hydrogen from a mixed gas containing hydrogen, and of dissociation of hydrogen in a state of atoms. Further, the present invention relates to a method of preparation of a material used for the membrane. The present invention also relates to a method of treatment to activate the membrane.

BACKGROUND OF THE INVENTION

At present, as a material for a gas hydrogen-separating membrane, Pd or Pd alloy is used, but their prices are so expensive as to be a major impediment to practical applications.

Therefore, a search for a metal membrane material of non-noble metal has been energetically made. In many instances, however, it has been necessary to coat a surface of the metal membrane with a noble metal, such as Pd and the like, in order to prevent the membrane surface from being oxidized, and to dissociate hydrogen molecules, which are then dissolved in the metal.

A number of electrochemical studies on hydrogen permeation have been reported, in which hydrogen is supplied in the form of ions, and a strong driving force for hydrogen permeation can be administered by applying voltage without applying mechanical force to the membrane. Accordingly, it is not assured that the membrane is utilizable for separation of gaseous hydrogen, which requires dissociation of hydrogen molecules, and uses pressure difference as a driving force, with the membrane left as it is.

With respect to amorphous (noncrystalline) Zr—Ni alloy, there is only an example in which a thin membrane of two layers of Pd and amorphous Zr—Ni alloy was formed on a silicon substrate by a sputtering method, and its rate of hydrogen permeation was electrochemically measured (J. O. Ström-Olsen, Y. Zhao, D. H. Ryan, Y. Huai, R. W. Cochrane; "Hydrogen diffusion in amorphous Ni—Zr"; J. Less-Common Metals, Vol. 172–174 (1991) pp. 922–927). It has not been clearly understood whether or not amorphous Zr—Ni alloy can be applied directly to the separation and purification of hydrogen gas.

SUMMARY OF THE INVENTION

An object of the present invention is to provide a metal membrane for separation and dissociation of hydrogen, which has high permeability only with regard to hydrogen, sufficient mechanical strength and structural stability in an atmosphere of hydrogen, and which does not require, substantially, noble metals, such as Pd and the like.

Other and further objects, features, and advantages of the invention will appear more fully from the following description, taken in connection with the accompanying drawings.

DETAILED DESCRIPTION OF THE INVENTION

Figure 1:
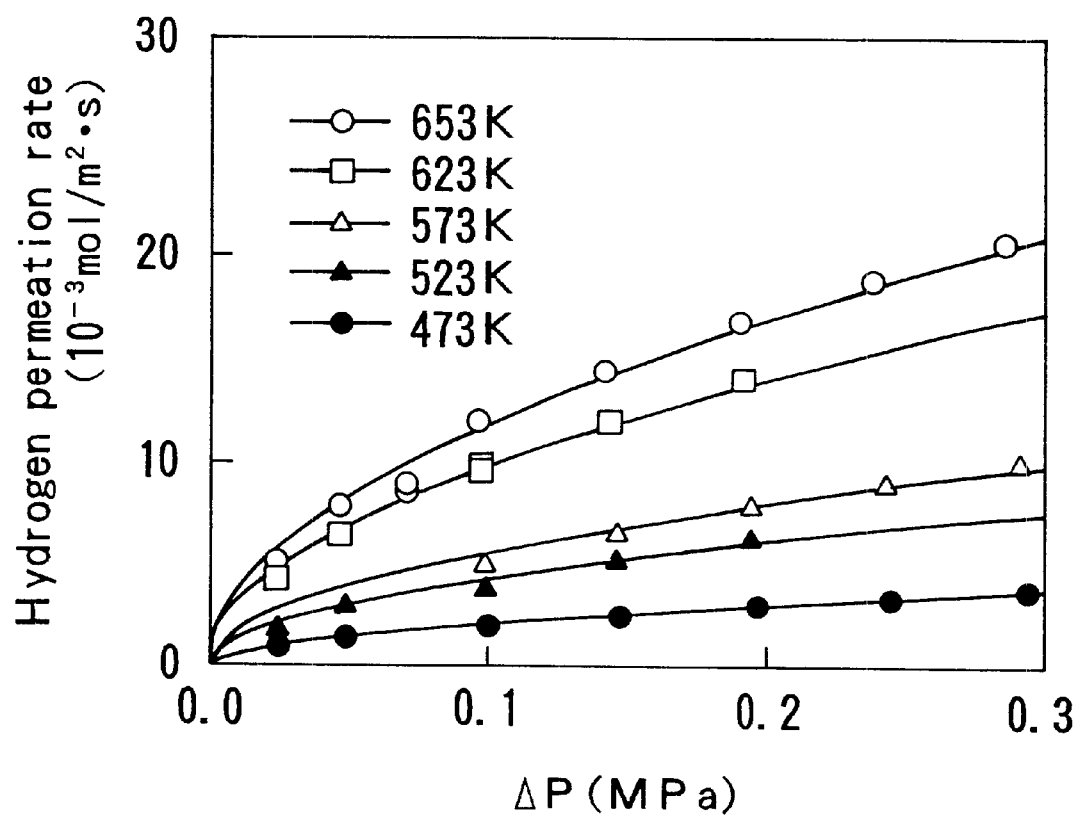
FIG. 1 shows a relation between the hydrogen permeation rate ($10^{-3}$ mol/m$^2$·s) and the difference in partial pressure of hydrogen (MPa) on both surfaces of the membrane, at 473K, 523K, 573K, 623K, and 653K, with respect to the hydrogen separation.dissociation membrane of Example 1, after activation, respectively.

The above object of the present invention can be attained by the following means.

(1) A membrane for separation and dissociation of hydrogen, which comprises an amorphous alloy comprising at least one selected from the group consisting of Zr and Hf, and Ni.

(2) The membrane for separation and dissociation of hydrogen as stated in the above (1), wherein the amorphous alloy is an amorphous Zr—Ni alloy.

(3) The membrane for separation and dissociation of hydrogen as stated in the above (1), wherein the amorphous alloy is an amorphous Hf—Ni alloy.

(4) The membrane for separation and dissociation of hydrogen as stated in the above (1), wherein the amorphous alloy is an amorphous Hf—Zr—Ni alloy.

(5) A membrane for separation and dissociation of hydrogen, which comprises an amorphous multicomponent alloy comprising at least one selected from the group consisting of Zr and Hf, and Ni, as major components.

(6) The membrane for separation and dissociation of hydrogen as stated in the above (5), wherein the amorphous multicomponent alloy comprises Zr and Ni, as major components.

(7) The membrane for separation and dissociation of hydrogen as stated in the above (5), wherein the amorphous multicomponent alloy comprises Hf and Ni, as major components.

(8) The membrane for separation and dissociation of hydrogen as stated in the above (5), wherein the amorphous multicomponent alloy comprises Hf, Zr, and Ni, as major components.

(9) The membrane for separation and dissociation of hydrogen as stated in the above (5), (6), (7), or (8), wherein the amorphous multicomponent alloy in which Cu is added as a third component is used.

(10) A method of preparing a material for a membrane for separation and dissociation of hydrogen, comprising mixing at least one selected from the group consisting of Zr and Hf, with Ni, heating the resultant mixture to the melting point thereof, or higher, in an inert gas, and melt-quenching the heated mixture, to prepare the material.

(11) The method of preparing a material for a membrane for separation and dissociation of hydrogen as stated in the above (10), wherein Cu is further mixed in the mixing step.

(12) A method of treating for activation of a membrane for separation and dissociation of hydrogen, comprising exposing a membrane for separation and dissociation of hydrogen to an atmosphere containing an active gas, at the crystallization temperature of materials contained in the membrane, or lower.

(13) The method of treating for activation of a membrane for separation and dissociation of hydrogen as stated in the above (12), wherein the atmosphere containing an active gas is a hydrogen or oxygen atmosphere.

(14) The method of treating for activation of a membrane for separation and dissociation of hydrogen as stated in the above (12) or (13), wherein the materials contained in the membrane comprises at least one selected from the group consisting of Zr and Hf, and Ni.

It has become clear that amorphous alloys defined in the present invention have excellent surface activity concerning dissociation of hydrogen molecule.

Accordingly, it has also become clear that the amorphous alloys for use in the present invention exhibit high hydrogen-dissociation ability and have sufficient hydrogen permeability, even if they are not coated with noble metals, such as Pd and the like.

Further, it has become clear that the amorphous alloys for use in the present invention can be used as a hydrogen-separating membrane that does not substantially require a support of porous materials, hydrogen-permeable metals, and the like, because of having sufficient mechanical strength and structural stability in an atmosphere of hydrogen.

Furthermore, it becomes clear that stable hydrogen permeation characteristics can be obtained, and the hydrogen permeation rate can be improved, for a short period of time, by exposing both surfaces of the membrane of the above-described amorphous alloy to an atmosphere containing active gas, such as hydrogen, oxygen, and the like, at the temperatures or below the crystallization temperature of the materials contained in the membrane.

The term "atmosphere containing active gas" used in the present invention means an atmosphere containing one of the above active gases, and it is allowable for an inert gas, such as argon and the like, to be present therein.

Therefore, the hydrogen-separation dissociation membrane of the present invention has the advantage that not only it does not substantially require either noble metals, such as Pd, Pt, Ru, and the like, as a catalyst for dissociation of hydrogen molecules, but also it does not substantially require a support of porous materials, hydrogen permeable metals, and the like.

There is a case in which crystallization proceeds to some degree for an amorphous alloy by preserving it at high temperature, even though the temperature is below the alloy's crystallization temperature. It is, however, known that the amorphous alloy membrane of the present invention does not suffer from change in hydrogen permeation characteristics largely by heat treatment before the use, and from membrane disintegrates with longterm experiments.

Accordingly, the term "amorphous" used in the present invention means, for example, a material that gives a spectrum having a half-width ($\Delta 2\theta$) of 0.1° or above in X-ray diffraction pattern by the $\theta$–$2\theta$ method, and it means any material having some general characteristics for an amorphous, and any method for preparing thereof may be adopted in the present invention. Examples of the method of preparing the amorphous alloy include a melt-quenching method, preferably a single-roller melt-quenching method. The production conditions, such as temperature, rotation rate, and pressure, are not particularly limited and the usual ones can be applied.

The amorphous alloy that can be used in the present invention is not particularly limited in its composition, as long as the amorphous alloy contains at least one alloy component selected from the group consisting of Zr and Hf, and another alloy component of Ni. In the present invention, Zr:Ni, Hf:Ni, and (Hf+Zr):Ni each are preferably in the molar ratio of (30:70) to (40:60), more preferably (36:64) ±2%, and most preferably 36:64.

The amorphous alloy that can be used in the present invention is preferably an amorphous multicomponent alloy comprising Zr and Ni, Hf and Ni, or Hf and Zr and Ni, as its major components. Herein, the "major components" means that the above alloy components are contained in the alloy in amounts sufficient to make the resultant amorphous alloy membrane separate/dissociate hydrogen. For example, the ratio of the alloy components that would be the major components in the alloy composition is preferably more than 90 mol%, and more preferably more than 95 mol%, in the entire alloy.

Examples of the alloy components other than the major components include Cu, Ag, Al, Zn, and Ti. These components can make the resultant amorphous alloy more stabilized, and therefore, can make durability and hydrogen permeation rate of the membrane comprising the alloy more increased. When Ti is contained, Ti contributes high permeation rate of hydrogen. Furthermore, in the present invention, the alloy components other than the major components can include B, Si, and P, in order to prepare the amorphous alloy easily.

In the present invention, the "third component" means alloy component(s) other than the major components and it is preferably Cu. The ratio of the third component(s), such as Cu, in the alloy is preferably 10 mol% or less, and more preferably 5 mol% or less.

In accordance with the present invention, a hydrogen-separating membrane can be obtained without using noble metals, such as Pd and the like, and without applying any complicated treatment to a ribbon-shaped sample prepared by using a single-roller melt-quenching. Accordingly, the raw material cost can be reduced to approximately take a figure down two places, as compared with that of a conventional Pd alloy membrane, and the manufacturing cost can also be suppressed in extremely low. By using such a membrane, hydrogen of high purity required for the production of a semiconductor or for a fuel cell, can be supplied at low cost. Further, since it is known that the permeation rate through a metal membrane is generally different among hydrogen, deuterium, and tritium, it may be expected that hydrogen isotope separation can be carried out by using the membrane of the present invention.

The present invention will be described in more detail with reference to the following examples, but the present invention is not restricted to them.

EXAMPLES

Example 1

8.7 g of Zr and 10.0 g of Ni were melted by arc melting in an atmosphere of argon of 50 kPa, to obtain an alloy specimen, which was ground into particles of several millimeters in diameter, placed in a quartz nozzle, and melted by high-frequency induction heating in an atmosphere of argon of 50 kPa. The molten metal thus obtained was sprayed to the periphery of a copper roller of 200 mm in diameter, rotating at 2000 rpm, to be quenched, to obtain ribbon-shaped amorphous $Zr_{36}Ni_{64}$, 5 mm in width and 0.03 mm in thickness.

The amorphous membrane thus obtained was fixed to a gas permeation measuring cell. To one surface of the membrane, pure hydrogen or a mixed gas of argon and hydrogen was introduced, and to the other surface, argon was introduced as a sweep gas. Evaluation of the hydrogen permeation was carried out by analyzing the composition of the sweep gas exhausted out of the cell, using gas chromatography. Activation treatment was carried out before an experiment on hydrogen permeation, in which both surfaces of the membrane were exposed to an atmosphere of hydrogen of 0.3 MPa at 573 K for one hour, and thereafter hydrogen permeation was conducted once at 653 K.

The hydrogen permeation rate at 473 to 653 K is shown in FIG. 1.

In general, a metal membrane does not exhibit sufficient hydrogen permeation characteristics, because an oxide layer and the like on the surface are obstructions to dissociative dissolution of hydrogen, if the metal membrane is left as it is. Since, however, Ni was segregated on the surface in an atmosphere of hydrogen in the case of the amorphous $Zr_3Ni_{64}$ alloy, which functioned as a catalyst for hydrogen dissociation, it could exert excellent hydrogen permeation characteristics without a coating of a noble metal, such as Pd and the like.

Further, since the amorphous $Zr_{36}Ni_{64}$ alloy maintained sufficient mechanical strength in an atmosphere of hydrogen despite being thin, that is, 0.03 mm in thickness, a permeation flux of a level for practical applications, on the order of 1 cm$^3$ (STP)/cm$^2$·min for 0.1 MPa of feed pressure, could be realized. Herein, "1 cm$^3$ (STP)/cm$^2$·min" is equal to "$6.8 \times 10^{-3}$ mol/m$^2$·s".

Further, by an experiment conducted by supplying helium, which is unable to permeate the metal membrane, instead of hydrogen, it was confirmed that the specimen was not disintegrated and only hydrogen was allowed to permeate selectively.

As a result, permeation of helium was not observed at all, in the range of from 473 K to 653 K, after measurement of hydrogen permeation, and the membrane was not disintegrated. Therefore, it was found that the membrane could be used as a hydrogen-separating membrane.

Since the measurement limitation of the measuring apparatus used herein with respect to helium is $1 \times 10^{-7}$ mol/m$^2$·s, the ratio of hydrogen permeation rate to helium permeation rate is at least $10^5$. It is usually very difficult to realize a separating membrane having such a high selectivity for hydrogen unless such a non-porous metal membrane of the above is used.

Furthermore, it was confirmed that the membrane of this example could resist the difference in pressure of 0.2 MPa at any temperature between 473 K and 653 K, and that the membrane could withstand experiments on hydrogen permeation that continued for four weeks.

Furthermore, the amorphous $Zr_{36}Ni_{64}$ alloy membrane, both surfaces of which were coated with 10 nm of Pd by a sputtering method, could give a stable hydrogen permeation rate without applying activation treatment. Since, however, its rate is almost the same as that of amorphous $Zr_{36}Ni_{64}$ alloy membrane without Pd coating to which is applied activation treatment, it was found that sufficient activity for hydrogen dissociation can be obtained without noble metals, such as Pd and the like.

Example 2

14.1 g of Zr, 16.2 g of Ni, and 1.4 g of Cu were melted by arc melting in an atmosphere of argon of 50 kPa, to obtain an alloy specimen, which was ground into particles of several millimeters in diameter, placed in a quartz nozzle, and melted by high-frequency induction heating in an atmosphere of argon of 50 kPa. The molten metal thus obtained was sprayed to the periphery of a copper roller 200 mm in diameter rotating at 2000 rpm, to be quenched, to obtain ribbon-shaped amorphous $Zr_{34}Ni_{61}Cu_5$, 5 mm in width and approximately 0.04 mm in thickness. The amorphous membrane thus obtained was fixed to a gaspermeation measuring cell, which was then set at 573 K.

The hydrogen permeation rate after approximately two hours from the introduction of a mixed gas of argon-26% hydrogen at atmospheric pressure at 573 K, was $0.02 \times 10^{-3}$ mol/m$^2$·s (at 573 K, 0.1 MPa, Ar—26%H$_2$) before applying activation treatment. The hydrogen permeation rate was improved up to $2.2 \times 10^{-3}$ mol/m$^2$·s (at 573 K, 0.1 MPa, Ar—26%H$_2$) by carrying out activation treatment, in which both surfaces of the membrane had been exposed to an atmosphere of pure hydrogen of atmospheric pressure at 573 K. It is understood that the membrane without containing noble metals, such as Pd and the like, has sufficient activity for dissociation of hydrogen, because the rate of hydrogen permeation of the membrane for a specimen, on both surfaces of which Pd was coated with thickness of 10 nm, by a sputtering method, was $2.3 \times 10^{-3}$ mol/m$^2$·s (at 573 K, 0.1 MPa, Ar—26%H$_2$).

Example 3

12.5 g of Hf and 7.3 g of Ni were melted by arc melting in an atmosphere of argon of 50 kPa, to obtain an alloy specimen, which was ground into particles of several millimeters in diameter, placed in a quartz nozzle, and melted by high-frequency induction heating in an atmosphere of argon of 70 kPa. The molten metal thus obtained was sprayed to the periphery of a copper roller of 200 mm in diameter, rotating at 1900 rpm, to be quenched, to obtain ribbon-shaped amorphous $Hf_{36}Ni_{64}$, 5 mm in width and 0.04 mm in thickness.

The amorphous membrane thus obtained was fixed to a gas permeation measuring cell and set to 623 K. To one surface of the membrane, pure hydrogen or a mixed gas of argon and hydrogen was introduced, and to the other surface, argon was introduced as a sweep gas. Evaluation of the hydrogen permeation was carried out by analyzing the composition of the sweep gas exhausted out of the cell, using gas chromatography.

Before applying activation treatment, the rate of hydrogen permeation after one hour from introduction of a mixed gas of argon-26% hydrogen at atmospheric pressure was $0.02 \times 10^{-3}$ mol/m$^2$·s (at 623K, 0.1 MPa, Ar—26%H$_2$). The rate was improved up to $0.08 \times 10^{-3}$ mol/m$^2$·s (at 623K, 0.1 MPa, Ar—26%H$_2$) by exposing both surfaces of the membrane to a mixed gas of argon-26% hydrogen of atmospheric pressure for one hour, as activation treatment. Subsequently, the rate was improved up to $0.22 \times 10^{-3}$ mol/m$^2$·s (at 623K, 0.1 MPa, Ar—26%H$_2$) by exposing both surfaces of the membrane to pure hydrogen of atmospheric pressure for one hour, as activation treatment, and the rate was further improved up to $0.40 \times 10^{-3}$ mol/m$^2$·s (at 623K, 0.1 MPa, Ar—26%H$_2$) by exposing both surfaces of the membrane to pure hydrogen of 0.3 MPa for one hour, as activation treatment.

It has become clear that a gas to be used for activation is not necessarily to be hydrogen, but effects on improvement of the permeation rate similar to those already discussed above could be obtained by the use of oxygen and the like.

Figure 2:
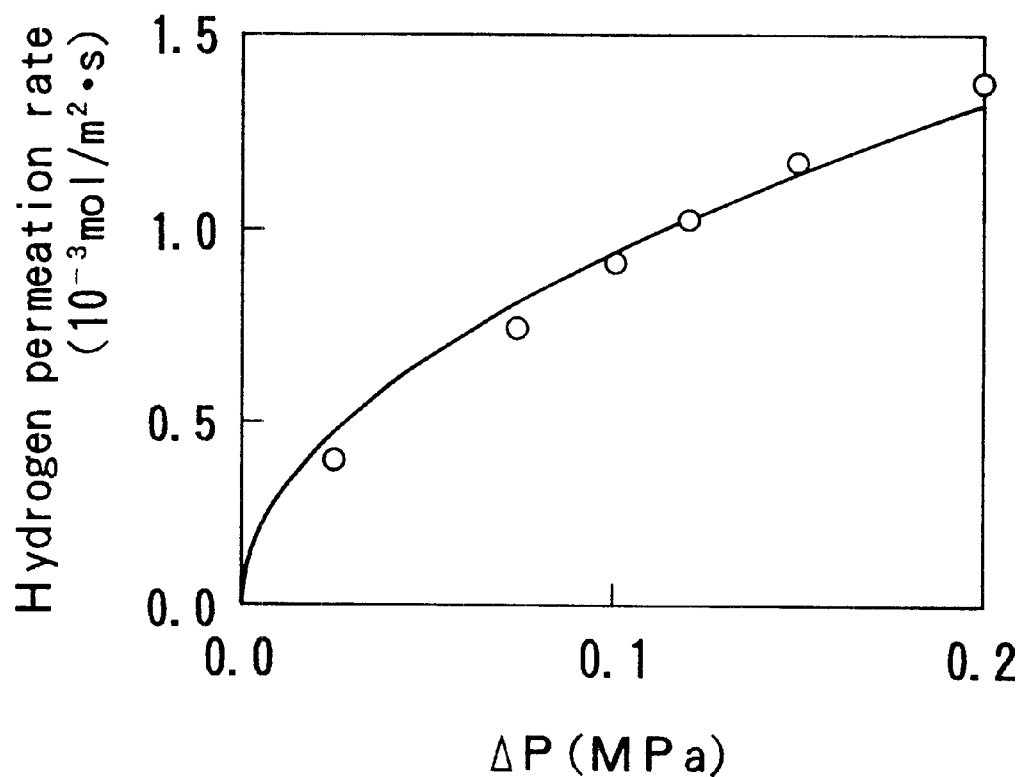
FIG. 2 is an explanatory view showing a relation between hydrogen permeation rate ($10^{-3}$ mol/m$^2$·s) and the difference in partial pressure of hydrogen (MPa) on both surfaces of the membrane, at 623K, with respect to the hydrogen separation.dissociation membrane of Example 3 that was treated for activation by pure hydrogen of 0.3 MPa.

The rate of hydrogen permeation at 623K after activation treatment by pure hydrogen of 0.3 MPa is shown in FIG. 2.

In general, a metal membrane does not exhibit sufficient hydrogen permeation characteristics, because an oxide layer and the like on the surface are obstructions to dissociative dissolution of hydrogen, if the membrane is left as it is. Since, however, similarly in the amorphous Zr—Ni alloy, Ni was segregated on the surface in an atmosphere of hydrogen in the case of the amorphous $Hf_{36}Ni_{64}$ alloy, which functioned as a catalyst for hydrogen dissociation, it could exert excellent hydrogen permeation characteristics without a coating of a noble metal, such as Pd and the like.

Further, by an experiment conducted by supplying helium, which is unable to permeate the metal membrane, instead of hydrogen, it was confirmed that the specimen was not disintegrated and only hydrogen was allowed to permeate selectively.

As a result, permeation of helium was not observed at all after pure hydrogen of 0.2 MPa was introduced to a feed side, to allow the hydrogen to permeate, and it was found that the membrane of the present invention has sufficient mechanical strength in an atmosphere of hydrogen despite its being thin, that is, 0.04 mm in thickness.

Since the measurement limitation of the measuring apparatus used herein with respect to helium is $1 \times 10^{-7}$ mol/m$^2$·s, the ratio of hydrogen permeation rate to helium permeation rate is at least $10^4$. It is usually very difficult to realize a separating membrane having such a high selectivity for hydrogen unless such a non-porous metal membrane of the above is used.

Furthermore, the amorphous $Hf_{36}Ni_{64}$ alloy membrane, both surfaces of which were coated with 100 nm of Pd by a sputtering method, could give a stable, high rate of hydrogen permeation, without applying activation treatment. Meantime, the amorphous alloy membrane, both surfaces of which were coated with noble metals, such as Pd and the like, can exert the said rate of hydrogen permeation without lowering at the time of separating hydrogen from a mixed gas containing carbon. dioxide and the like. Therefore, the utilization in such a form as described above could be considered in the present invention.

Example 4

12.1 g of Hf, 7.1 g of Ni, and 0.6 g of cu were melted by arc melting in an atmosphere of argon of 50 kPa, to obtain an alloy specimen, which was ground into particles of several millimeters in diameter, placed in a quartz nozzle, and melted by high-frequency induction heating in an atmosphere of argon of 70 kPa. The molten metal thus obtained was sprayed to the periphery of a copper roller 200 mm in diameter rotating at 2000 rpm, to be quenched, to obtain ribbon-shaped amorphous $Hf_{34}Ni_{61}Cu_5$, 5 mm in width and approximately 0.04 mm in thickness. The amorphous membrane thus obtained was fixed to a gas-permeation measuring cell, which was then set at 623K.

Before applying activation treatment, the rate of hydrogen permeation after one hour from introduction of a mixed gas of argon-26% hydrogen at atmospheric pressure was $1.1 \times 10^{-3}$ mol/m$^2$·s (at 623K, 0.1 MPa, Ar—26%$H_2$). The rate was improved up to $1.5 \times 10^{-3}$ mol/m$^2$·s (at 623K, 0.1 MPa, Ar—26%$H_2$) by exposing, at 623K, both surfaces of the membrane to a mixed gas of argon-26% hydrogen of atmospheric pressure for one hour, as activation treatment. It was, further, confirmed that the membrane of this example was not disintegrated when the feed pressure of the mixed gas was increased to 0.15 MPa while the permeation side was maintained at atmospheric pressure, and that the membrane could exhibit permselectivity only to hydrogen.

Example 5

7.3 g of Hf, 3.8 g of Zr, and 8.7 g of Ni were melted by arc melting in an atmosphere of argon of 50 kPa, to obtain an alloy specimen, which was ground into particles of several millimeters in diameter, placed in a quartz nozzle, and melted by high-frequency induction heating in an atmosphere of argon of 70 kPa. The molten metal thus obtained was sprayed to the periphery of a copper roller 200 mm in diameter rotating at 2000 rpm, to be quenched, to obtain ribbon-shaped amorphous $Hf_{18}Zr_{18}Ni_{64}$, 5 mm in width and approximately 0.04 mm in thickness. The amorphous membrane thus obtained was fixed to a gas-permeation measuring cell, which was then set at 623 K.

Before applying activation treatment, the rate of hydrogen permeation after one hour from introduction of a mixed gas of argon-26% hydrogen at atmospheric pressure was $0.5 \times 10^{-3}$ mol/m$^2$·s (at 623K, 0.1 MPa, Ar—26%$H_2$). The rate was improved up to $1.0 \times 10^{-3}$ mol/m$^2$·s (at 623 K, 0.1 MPa, Ar—26%$H_2$) by exposing both surfaces of the membrane to a mixed gas of argon-26% hydrogen of atmospheric pressure for one hour at 623 K, as activation treatment. Subsequently, the rate was improved up to $1.9 \times 10^{-3}$ mol/m$^2$·s (at 623K, 0.1 MPa, Ar—26%$H_2$) by exposing both surfaces of the membrane to pure hydrogen of 0.3 MPa for one hour at 623 K, as activation treatment. Further, the membrane of this example was not disintegrated when to the feed side was introduced a pure hydrogen at 0.2 MPa while the permeation side was maintained at atmospheric pressure, and it was confirmed that the membrane could exhibit permselectivity only to hydrogen.

Having described our invention as related to the present embodiments, it is our intention that the invention not be limited by any of the details of the description, unless otherwise specified, but rather be construed broadly within its spirit and scope as set out in the accompanying claims.

What we claim is:

1. A method for separating hydrogen from a mixed gas containing dihydrogen, comprises:

feeding the mixed gas to a membrane for separation and dissociation of hydrogen, the membrane comprising an amorphous alloy comprising at least one metal selected from the group consisting of Zr and Hf, and Ni, as major components, and is being prepared by melt-quenching, and is non-porous, wherein the membrane is capable of separating dihydrogen from a mixed gas containing dihydrogen, by dissociating dihydrogen into hydrogen atoms, to make the hydrogen atoms permeate through the membrane, and forming dihydrogen from the hydrogen atoms after permeating through the membrane.

2. A method for separating hydrogen from a mixed gas containing dihydrogen, comprises:

feeding the mixed gas to a membrane for separation and dissociation of hydrogen, the membrane comprising an amorphous multicomponent alloy comprising at least one metal selected from the group consisting of Zr and Hf, and Ni, as major components, and is being prepared by melt-quenching, and is non-porous, wherein the membrane is capable of separating dihydrogen from a mixed gas containing dihydrogen, by dissociating dihydrogen into hydrogen atoms, to make the hydrogen atoms permeate through the membrane, and forming dihydrogen from the hydrogen atoms after permeating through the membrane.

3. The method as claimed in claim 2, wherein the amorphous multicomponent alloy further contains at least one element selected from the group consisting of Cu, Ag, Al, Zn, Ti, B, Si and P as a third component.

4. A membrane for separation and dissociation of hydrogen, which comprises an amorphous alloy comprising at least one metal selected from the group consisting of Zr and Hf, and Ni, as major components, and is being prepared by melt-quenching, and is non-porous, wherein the membrane is capable of separating dihydrogen from a mixed gas containing dihydrogen, by dissociating dihydrogen into hydrogen atoms, to make the hydrogen atoms permeate through the membrane, and forming dihydrogen from the hydrogen atoms after permeating through the membrane.

5. The membrane for separation and dissociation of hydrogen as claimed in claim 4, wherein the amorphous alloy is an amorphous Zr—Ni alloy.

6. The membrane for separation and dissociation of hydrogen as claimed in claim 4, wherein the amorphous alloy is an amorphous Hf—Ni alloy.

7. The membrane for separation and dissociation of hydrogen as claimed in claim 4, wherein the amorphous alloy is an amorphous Hf—Zr—Ni alloy.

8. The membrane for separation and dissociation of hydrogen as claimed in claim 4, wherein the alloy is not coated with palladium.

9. The membrane for separation and dissociation of hydrogen as claimed in claim 4, wherein the membrane is being exposed to an atmosphere containing at least one active gas.

10. The membrane as claimed in claim 4, which has mechanical strength sufficient to omit a support for the membrane to prevent from being disintegrated when exposed to an atmosphere containing hydrogen.

11. A membrane for separation and dissociation of hydrogen, which comprises an amorphous multicomponent alloy comprising at least one metal selected from the group consisting of Zr and Hf, and Ni, as major components, and is being prepared by melt-quenching, and is non-porous, wherein the membrane is capable of separating dihydrogen from a mixed gas containing dihydrogen, by dissociating dihydrogen into hydrogen atoms, to make the hydrogen atoms permeate through the membrane, and forming dihydrogen from the hydrogen atoms after permeating through the membrane.

12. The membrane for separation and dissociation of hydrogen as claimed in claim 11, wherein the amorphous multicomponent alloy further contains Cu as a third component.

13. The membrane for separation and dissociation of hydrogen as claimed in claim 11, wherein the amorphous multicomponent alloy comprises Zr and Ni, as major components.

14. The membrane for separation and dissociation of hydrogen as claimed in claim 13, wherein the amorphous multicomponent alloy further contains Cu as a third component.

15. The membrane for separation and dissociation of hydrogen as claimed in claim 11, wherein the amorphous multicomponent alloy comprises Hf and Ni, as major components.

16. The membrane for separation and dissociation of hydrogen as claimed in claim 15, wherein the amorphous multicomponent alloy further contains Cu as a third component.

17. The membrane for separation and dissociation of hydrogen as claimed in claim 11, wherein the amorphous multicomponent alloy comprises Hf, Zr, and Ni, as major components.

18. The membrane for separation and dissociation of hydrogen as claimed in claim 17, wherein the amorphous multicomponent alloy further contains Cu as a third component.

19. The membrane for separation and dissociation of hydrogen as claimed in claim 11, wherein the alloy is not coated with palladium.

20. The membrane for separation and dissociation of hydrogen as claimed in claim 11, wherein the membrane is being exposed to an atmosphere containing at least one active gas.

21. The membrane for separation and dissociation of hydrogen as claimed in claim 11, wherein the amorphous multicomponent alloy further contains at least one element selected from the group consisting of Cu, Ag, Al, Zn, Ti, B, Si and P as a third component.

22. The membrane as claimed in claim 11, which has mechanical strength sufficient to omit a support for the membrane to prevent from being disintegrated when exposed to an atmosphere containing hydrogen.

23. A method of preparing a material for a membrane for separation and dissociation of hydrogen, comprising mixing at least one metal selected from the group consisting of Zr and Hf, with Ni, heating the resultant mixture to a temperature equal to or higher than the melting point thereof, and melt-quenching the heated mixture, to prepare the material, wherein the membrane is non-porous and capable of separating dihydrogen from a mixed gas containing dihydrogen, by dissociating dihydrogen into hydrogen atoms, to make the hydrogen atoms permeate through the membrane, and forming dihydrogen from the hydrogen atoms after permeating through the membrane.

24. The method of preparing a material for a membrane for separation and dissociation of hydrogen as claimed in claim 23, wherein Cu is further mixed in the mixing step.

25. The membrane for separation and dissociation of hydrogen as claimed in claim 23, wherein the amorphous multicomponent alloy further contains at least one element selected from the group consisting of Cu, Ag, Al, Zn, Ti, B, Si and P as a third component.

26. A method of treating for activation of a membrane for separation and dissociation of hydrogen, comprising exposing a membrane for separation and dissociation of hydrogen to an atmosphere containing at least one active gas, at a temperature equal to or lower than the crystallization temperature of materials of which the membrane is comprised, wherein the membrane is capable of separating dihydrogen from a mixed gas containing dihydrogen, by dissociating dihydrogen into hydrogen atoms, to make the hydrogen atoms permeate through the membrane, and forming dihydrogen from the hydrogen atoms after permeating through the membrane, and wherein the membrane is being prepared by melt-quenching, and is non-porous.

27. The method of treating for activation of a membrane for separation and dissociation of hydrogen as claimed in claim 26, wherein the materials contained in the membrane comprises at least one selected from the group consisting of Zr and Hf, and Ni.

28. The method of treating for activation of a membrane for separation and dissociation of hydrogen as claimed in claim 26, wherein the atmosphere containing at least one active gas is a hydrogen or oxygen atmosphere.

29. The method of treating for activation of a membrane for separation and dissociation of hydrogen as claimed in claim 28, wherein the materials contained in the membrane comprises at least one selected from the group consisting of Zr and Hf, and Ni.

30. The membrane as claimed in claim 4, wherein the molar ratio of (Hf+Zr):Ni in the amorphous alloy is in the range of 30:70 to 40:60.

31. The membrane as claimed in claim 11, wherein the amorphous multicomponent alloy comprises 90 mol% or more of at least one metal selected from the group consisting of Zr and Hf, and Ni as major components, and 10 mol% or less of at least one metal selected from the group consisting of Cu, Ag, Al, Zn, Ti, B, Si and P as a third component.

32. The membrane as claimed in claim 11, wherein the molar ratio of (Hf+Zr):Ni in the amorphous multicomponent alloy is in the range of 30:70 to 40:60.

* * * * *